US006914896B1

(12) United States Patent
Tomalewicz

(10) Patent No.: US 6,914,896 B1
(45) Date of Patent: Jul. 5, 2005

(54) EMERGENCY SERVICES MANAGEMENT NETWORK UTILIZING BROADBAND VOICE OVER DATA NETWORKS

(75) Inventor: Richard S. Tomalewicz, Lockport, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 09/434,640

(22) Filed: Nov. 5, 1999

(51) Int. Cl.[7] .............................................. H04L 12/66
(52) U.S. Cl. ....................................................... 370/352
(58) Field of Search ................................ 370/392, 352, 370/389, 395; 342/357.09, 450, 465, 457; 455/404, 460–466, 564, 426–434, 456, 404.2, 445, 456.5; 379/211.02, 207.02, 207.14, 207.15, 219–224, 45–49, 245, 37, 242, 265.01, 265.02, 265.09; 709/202; 348/231.99, 135; 702/115, 144, 150; 340/988

(56) References Cited

U.S. PATENT DOCUMENTS

| 5,742,904 | A | * | 4/1998 | Pinder et al. ................ 455/404 |
| 5,901,214 | A | * | 5/1999 | Shaffer et al. .............. 379/220 |
| 5,960,341 | A | * | 9/1999 | LeBlanc et al. ............ 455/426 |
| 5,973,643 | A | * | 10/1999 | Hawkes et al. ............. 342/457 |
| 5,999,965 | A | * | 12/1999 | Kelly .......................... 709/202 |
| 6,128,481 | A | * | 10/2000 | Houde et al. ............ 455/404.2 |
| 6,154,658 | A | * | 11/2000 | Caci ........................... 455/466 |
| 6,256,489 | B1 | * | 7/2001 | Lichter et al. .............. 455/404 |

* cited by examiner

Primary Examiner—Chi Pham
Assistant Examiner—Prenell Jones
(74) Attorney, Agent, or Firm—Welsh & Katz, Ltd.

(57) ABSTRACT

A method and apparatus are provided for processing a public safety call. The method includes the steps of receiving the public safety call and determining a geographic source of the public safety call. The method further includes the steps of determining an environment of the geographic source of the public safety call, identifying a resource to handle the public safety call based upon the determined environment and forwarding the call to the identified resource.

21 Claims, 2 Drawing Sheets

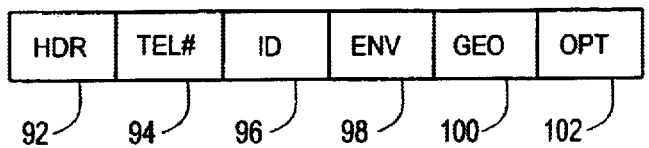
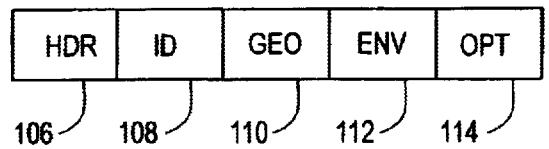
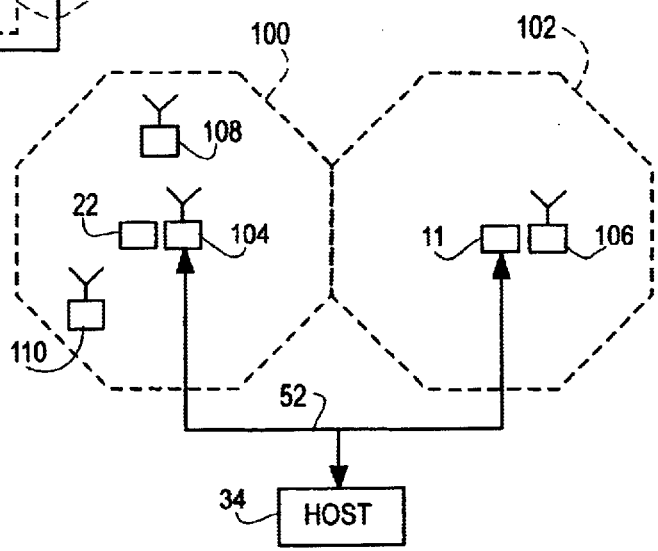

EMERGENCY SERVICES MANAGEMENT NETWORK UTILIZING BROADBAND VOICE OVER DATA NETWORKS

FIELD OF THE INVENTION

The field of the invention relates to communication systems and more particularly to the routing of 9-1-1 calls in a telephonic communication system.

BACKGROUND OF THE INVENTION

The use of the 9-1-1 number sequence to route telephone calls related to public safety is a well-known feature in many areas. As a 9-1-1 call is received by a central switching office (CSO) of the public switched telephone network (PSTN), the central switching office recognizes the number sequence as being a public safety call and routes the call to a public safety attended position (PSAP) at a local municipality.

An agent of the local municipality assigned to the PSAP takes the call and collects information from the caller (e.g., the reason for the call, the name of the caller, the address, etc.). Based upon the nature of the call, the agent may request assistance from the appropriate public service agency (e.g., police, fire, social services, etc.) and direct the requested assistance to the collected address.

In some areas, processing of 9-1-1 calls is expedited by information provided by the local CSO of the PSTN. For instance, automatic number identification (ANI) services operating from within the PSTN may be used to provide a telephone number of a caller to the PSAP agent at the same time as the call is delivered to the agent.

With the telephone number of the caller, the PSAP agent may be to help the caller without any further information. For example, if the caller is a young child who cannot give or does not know the address, the PSAP agent may determine the address based upon the telephone number. With the address, the PSAP agent may dispatch a social services worker or the police to further determine the source of the problem. Similarly, if the PSAP agent hears sounds of a struggle or choking, the PSAP agent may dispatch help in some appropriate manner.

While the existing method of processing 9-1-1 calls is effective in some cases, it deficient in others. For example, without any indication of a reason for a call, all calls must be routed to a common public service dispatcher. The common dispatcher must then, if possible, determine the reason for a call and forward the call to the proper public service agency, thereby providing an extra step in the resolution of the problem. Further, when civil strife or public emergency arises, the call processing capability of local PSAP agents may be quickly exceeded. Accordingly, a need exists for a method of processing 9-1-1 calls that is dynamic in nature and able to route calls based upon a context of the call.

SUMMARY

A method and apparatus are provided for processing a public safety call. The method includes the steps of receiving the public safety call and determining a geographic source of the public safety call. The method further includes the steps of determining an environment of the geographic source of the public safety call, identifying a resource to handle the public safety call based upon the determined environment and forwarding the call to the identified resource.

BRIEF DESCRIPTION OF THE DRAWINGS

FIG. 2 depicts a packet message that may be send to a host of the system of FIG. 1;

FIG. 3 depicts a packet that may be sent from the host to a selected public safety entity of the system of FIG. 1;

FIG. 4 depicts a CPU and display that may be used to place calls to the system of FIG. 1; and FIG. 5 depicts a reconfiguration of the system of FIG. 1 in the case of a natural or man-made disaster.

DETAILED DESCRIPTION OF A PREFERRED EMBODIMENT

Figure 1:
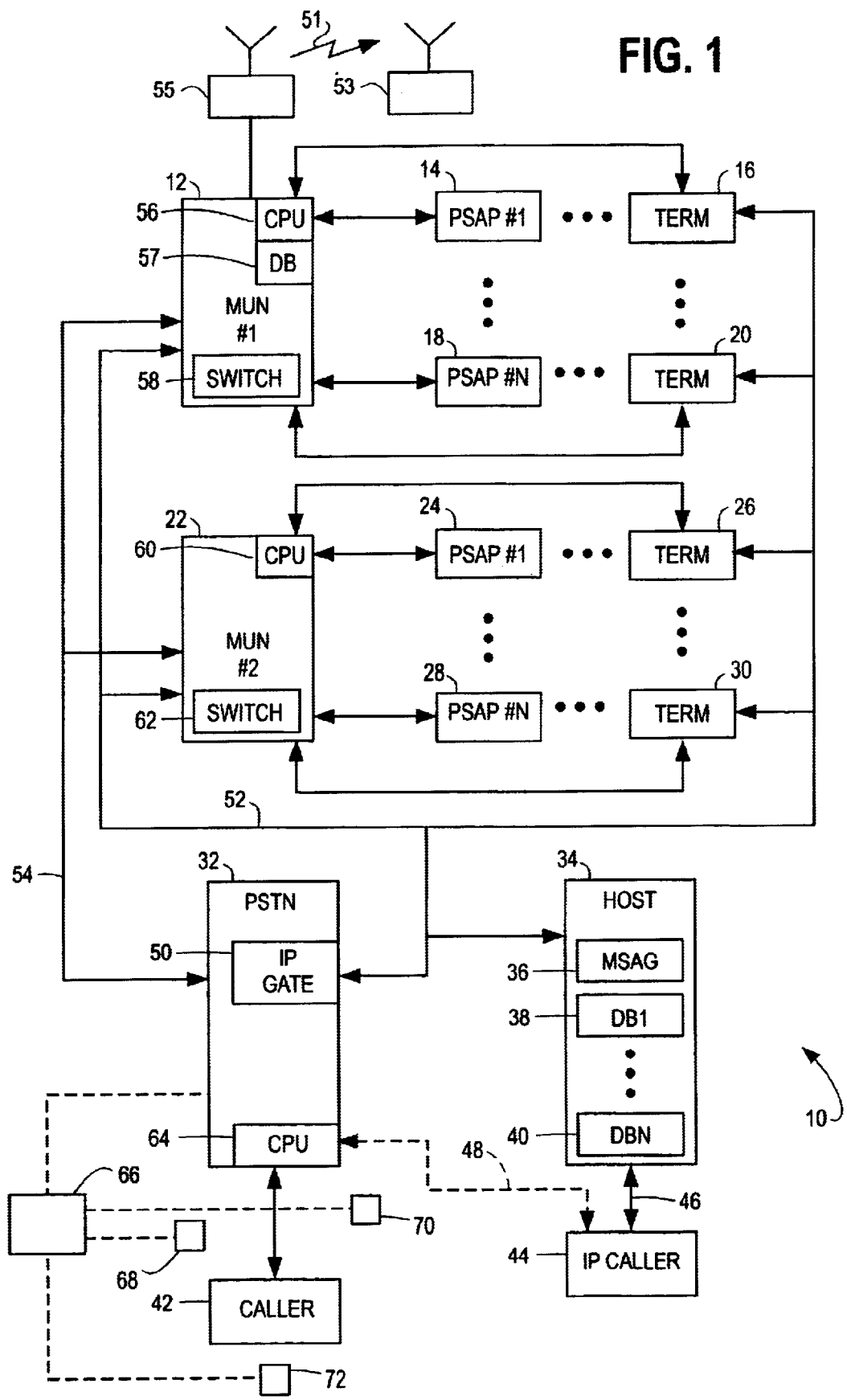
FIG. 1 is a block diagram of a system for processing public safety calls in accordance with an illustrated embodiment of the invention.

FIG. 1 is a block diagram of a system 10 that may be used to route public safety calls in accordance with an illustrated embodiment of the invention. A PSTN 32 may be used with the system 10 to receive and forward conventional 9-1-1 calls from a caller 42. Included within the system 10 is a host 34 that may also function to receive public safety calls from an IP caller 44.

Public safety calls received by the PSTN 32 and host 34 may be routed to an automatic call distributor (ACD) of a selected municipality (hereinafter sometimes referred to as municipality 12, 22 based upon database information contained in databases 36, 38, 40. From a selected municipality 12, 22, a public safety call may be routed by the ACD to a PSAP agent based upon factors associated with each particular agent. Distribution of calls to agents through one or more ACDs is a technology well known in the art and, therefore, will not be discussed further, except were necessary for an understanding of the invention.

It should be noted that each agent station of FIG. 1 may include an agent telephone 14, 18, 24, 28 and a respective agent terminal 16, 20, 26, 30. For convenience, reference made to an agent herein may be by the device of a particular workstation that the agent is using. For example, when PSAP agent #1 is using his telephone 14, he may be referred to as PSAP agent 14. When PSAP agent #1 is using an associated terminal 16, he may be referred to as PSAP agent 16.

As used herein, any expedited call from a caller to a public entity (e.g., police, fire, etc.) for public services regarding the safety, health or well-being of the caller is defined as a public safety call. A public safety call may originate from and be routed under any of a number of different formats. A 9-1-1 call to the local CSO may be regarded as a public safety call. Alternatively, an e-mail message or other appropriately formatted packet transmissions to the website of a public safety entity may be considered a public safety call.

Under the illustrated embodiment, public safety calls may be delivered to a selected public safety entity (e.g., a municipality) under a number of different methods. Under a first simple example, a caller 42 may dial 9-1-1. The call may be received by the PSTN 32 as a switched circuit call along with the telephone number of the caller based upon an ANI resource operating from within the PSTN 32.

Within the PSTN 32, a CPU 64 may recognize the call as a public safety call by the dialed digits and may compose a data packet 90 (FIG. 2) for transmission to the host 34. The data packet may include a header 92 containing the IP address of the host 34 and also a field 94 containing the telephone number of the caller 42. The packet may also include a call identifier 96 assigned by the CPU 64 for identification purposes. The CPU 64 may transfer the composed packet through an Internet gateway 50 and Internet connection 52 to the host 34.

Upon receipt of the packet by the host 34, the host 34 (by reference to a Master Street Address Guide database 36) may identify a geographic source (e.g., a street address, latitude and longitude, etc.) of the call. Following recovery of the geographic source, the host 34 may access other databases 38, 40 to determine an environment of the call. As used herein, the term "environment" may be any factor which affects selection of a public safety entity for responding to a public safety call from that geographic source.

For instance, if the caller were to be calling from a pay phone in a forest preserve, then a different public safety entity (e.g., a park service) may have responsibility for public safety matters at that geographic location than if the call were to originate in a residential area. Further, if the caller were to originate along an interstate highway then the subject matter of the call would more appropriately be a matter for the state police than a local police department.

Once an environment of a public safety call has been determined then the host 34 may select an appropriate public safety entity to handle the call. The host 34 may select the entity best suited to handle the call based upon the geographic source of the call and the specific environment of the call source. The criteria for selecting the public service entity may be recovered by reference to databases 38, 40 in the host 34.

In the example above, the criteria for selecting a public service entity may specify that a call from within the environs of a state park should be routed to state part authorities. A call from a city park should be routed to city authorities. A call from a federal reservation should be routed to federal authorities.

Upon selecting a public safety entity (e.g., municipality #1 12), the host 34 may compose a message 104 (FIG. 3) for transfer to the selected entity 12 through the Internet connection 52. The message 104 may include a header 106 (e.g., containing an IP address of a CPU 56 of the selected entity 12), an identifier 108 of the call (e.g., the telephone number of the caller, identifier assigned by the PSTN, an IP address of the caller, etc.), a geographic source 110 (e.g., an address, latitude and longitude, etc.) of the call, an indication of the environment 112 of the caller and any optional messages 114.

Upon composing the message 104, the host 34 may proceed to transfer the message 104 to the selected municipality 12. At the municipality 12, the CPU 56 may receive and store the message 104 received via the Internet connection 52. To complete the process, the host 34 may also take steps to create a voice path between the caller 42 and selected entity 12.

Creation of the voice-path between the caller 42 and the selected public safety entity 12 may be accomplished using one of at least two different methods depending upon the capacity of the IP gateway 50 and Internet connection 52 with the local CSO of the PSTN 32. Under a first method, the host 34 may send a call transfer message to the PSTN 32 instructing the PSTN 32 to transfer the call to the selected municipality 12.

The call transfer message may include the identifier of the call and a local telephone number of the selected public safety entity 12. The CPU 64 of the PSTN 32 receives the call transfer instruction and transfers the call to the selected public safety entity 12.

When the transferred call arrives at the selected public safety entity 12, the CPU 56 matches the ID of the transferred call with the ID of the stored packet 104. Based upon the geographic source and environmental information within the retrieved packet, the CPU 56 may select the most appropriate PSAP agent 14, 18 to receive the transferred call. Selection may be based upon which agent had been idle the longest or based upon some expertise in handling calls from the geographic source and environment provided in the associated message 104. Upon selecting an agent, the CPU 56 instructs the switch 58 to connect the transferred call to the agent 14, 18. At the same time, the CPU 56 may cause a screen pop on the terminal 16, 20 of the selected agent providing the geographic source and environment of the public safety call.

In the alternative, the host 34 may transfer the call to the selected public safety entity 12 using Internet telephony (voice-over-IP). To accomplish the voice-over-IP connection, the host 34 may include a specific request for a voice-over-IP connection within the original Internet message 104. The request may be included as an optional field 114 of the message 104. Transferring the call as voice-over-IP allows the call to be handled by any of a variety of selected public safety entities without the possibility of long distance charges accruing to the caller 42.

Upon receiving the composed message, the CPU 56 of the selected entity 12 may select an agent 16, 20. The CPU 56 may select a PSAP agent 16, 20 based upon any appropriate criteria. As above, selection may be based upon which agent had been idle the longest or based upon some expertise in handling calls from the geographic source and environment provided within the message 104.

Upon selecting an agent 16, 20, the CPU 56 may transfer the message 104, including the geographic source and environment information, to the select agent's terminal 16 along with the IP address of the gateway 50 of PSTN 32. The terminal 16, 20 of the selected agent 14, 18 receives the information and may send a request for an Internet telephony connection using the IP address of the IP gate 50. The IP gate 50 and terminal 16, 20 of the selected agent form the Internet telephony connection, the IP gate 50 connects the voice channel of the caller 42 to the voice plug of the Internet telephony connection and the caller and selected agent begin may begin conversing.

Under another illustrated embodiment of the invention, the PSTN caller 42 may be using a cellular telephone. In this case, ANI information delivered along with the call may be insufficient to identify a geographic source and, in fact, may only indicate the billing address of the cellular telephone, instead of an actual location.

In order to locate the cellular caller 42, the host 34 may query the PSTN 32 for the network source of the call (e.g., the identity of an originating cellular system 66 from which the call originates). Upon knowing the originating cellular telephone system 66, the host 34 now has a general area of the geographical source. To obtain a more precise geographical source, the host 34 may transmit a request to the cellular system 66 for information regarding cellular base transceiver stations (BTSs) 68, 70, 72 receiving a signal from the cellular caller 42.

As is well known in the cellular arts, handoff of signal transmission from one BTS to another is typically based upon indicia of geographical location of a cellular caller 42 among BTSs. Indicia of geographical location may be obtained based upon signal strength and timing advance measurements performed by BTSs surrounding a cellular unit 42. Further indication of geographical location may be obtained by the identity of sectorized antenna used at each BTS.

By identifying BTSs receiving a signal from the cellular unit 42, the host 34 may determine a latitude and longitude of each surrounding BTS. From the identity of sectorized antenna and signal strengths of the surrounding BTSs, the host 34 may triangulate a precise geographical source of the cellular user 42. Timing advance of the surrounding BTSs may be used to further improve upon the accuracy of the measurement.

With a geographic source of the signal from the cellular user 42, the host 34 may now determine an environment of the user's location. While the location of the geographic source may correlate to a street address, it is not necessary that there be a correlation. For example, the caller 42 may be in a boat suffering some sort of malfunction affecting the safety of the caller 42.

By determining a geographical source in terms of a latitude and longitude, the host 34 may determine the environment to be within the confines of a lake or wilderness area. If the location is determined to be within a lake area, the host 34 may determine that the selected public service entity should be the U.S. Coast Guard, or some other lake rescue unit. Once the public service entity has been identified, the host 34 may proceed as described above by transferring the call, including geographic source and environment, to the selected entity 12, 22.

In another embodiment of the invention, the cellular transceiver 42 may be incorporated into a automatic crash sensor 42 of an automobile and which is triggered by impact. As above, the geographical location of the caller 42 (and automobile) may be determined by triangulation among BTSs. A transmitted signal of the crash sensor 42 may be limited to a control channel of the cellular system 66 or may also be transmitted on an assigned voice channel.

As such, indication that the caller 42 is a crash sensor may be included in a channel request to a local BTS on a control channel. The indication may be forwarded from the cellular system 66 to the PSTN 32 and to the host 34 as part of the ANI information or as an ISDN user-to-user information element on an expedited basis. By forwarding indication that the caller 42 is a crash sensor, the host 34 may determine from the call associated data and databases 36, 38, 40 that on a first level the environment is a crash scene. By determining the geographic source of the call and by further reference to databases 38, 40, the host 34 may be able to gain further information regarding the environment and select a fire rescue unit closest to the geographic source of the transmission as the public safety entity to respond to the call. The host 34 may transfer the information to the selected public safety entity 12, 22 as described above.

The host 34 may store and maintain records by geographic source as to all public safety calls of a certain type and may be able to automatically generate reports on dangerous locations. By correlating public safety calls from crash sensors in time, the host 34 may be able to detect multi-vehicle accidents, thereby improving upon the scale of a response by a selected public service entity 12, 22.

Under another illustrated embodiment of the invention, a personal computer (PC) 44 may used to place a call for public safety assistance via the Internet either through the PSTN 32 or using a direct connection 46 between the PC 44 and the host 34. Where the PC 44 requests assistance through the PSTN 32, the connection may be either by direct connection 48 or via the cellular system 66.

The features of the PC 44 may be implemented on any of a number of computer platforms (e.g., IBM PC, ThinkPad, Palm Pilot, home security system, etc). For example, where the features of the PC A4 are provided on a Palm Pilot a cellular transceiver 86 (FIG. 4) may be provided as an interface between the PC 44 and cellular system 66.

FIG. 4 is a block diagram of the PC 44 under an illustrated embodiment. As shown, the PC 44 may be provided with a display 74 and CPU 76. On the display 74, a set of icons 78, 80 may be provided for placing calls for public safety assistance. If a user of the PC 44 were to require police assistance, the user would place a cursor over the police icon 78 and activate a selector. Similarly, if the user of the PC 44 were to require fire assistance, the user would place a cursor over the fire icon 80 and activate the selector button. A voice-over-IP resource 90 may be provided for the automatic exchange of voice information with an assigned PSAP agent following activation of an appropriate icon.

In the case of a home security system 44, the system may be configured to detect the type of help required. For example, the home security system 44 may have heat or smoke detectors to detect a fire. Alternatively, the system 44 may have glass breakage or motion detectors to detect a burglary.

Upon activation of an icon 78, 80 or detection of a home security threat, the CPU 76 may compose a packet message 104 for transmission to the host 34. The packet would contain a header 106 (i.e., a first information field) containing an IP address of the host 34 and a body containing a number of other information fields. A second field 108 may contain an identifier of a user of the PC 44. A third field 110 may contain an indicator of a geographic location of the PC 44. A fourth field 112 may contain an indicator of the environment which prompted the request (e.g., crime scene, fire, etc.). A fifth field 114 may be provided for optional information.

The geographical source of the transmission contained in the third field 110 may be obtained from external sources. In general, however, where the PC 44 is a stationary device located in the user's home, the third field may be used as the exclusive indication of geographical source. In this case, the user may enter his home address into the third field as an exclusive indication of geographic source.

The fourth field may be used to further define environmental conditions or geographic location. For example, where the user activates an icon, an optional text window may open for the user to enter additional geographic or environmental information, which may then be transmitted in the fourth or fifth field. As a more specific example, the user may activate the police icon and enter in the text window "There is a burglar in my house and I'm trapped in my bedroom".

As an alternative to manual entry of geographic information in the third field 110 by the user, the PC 44 may be provided with a global positioning system (GPS) receiver 88. The GPS 88 may periodically determine the position of the PC 44 and transfer the determined position in terms of longitude and latitude to a memory area 84. The determined geographic information may then be entered into the third field when a message 104 is composed.

As a further alternative, the primary source of geographic source may be obtained from a source external to the PC 44 (e.g., the cellular system 66) and the third field may be used as a flag to the host 34 to request the geographic source through the cellular system 66. For example, where the PC 44 is a Palm Pilot, the primary source of geographic location may be triangulation of a cellular signal from the cellular transceiver 86 of the PC 44 by BTSs 68, 70, 72 as described above. In this case, the fourth and fifth fields may contain optional geographic or environmental information entered by the user. For example, the user may press the FIRE icon and enter "I'm trapped on the third floor" into the fourth or fifth fields. Alternatively, the caller may request a voice connection using the optional field 114 and the VOIP facility 90.

Upon receipt of a packet message from a PC 44, the host 34 processes the information based upon information content. Where the PC 44 is a stationary computer in the user's home, the host 34 recovers the geographic source from the third field 110 and any auxiliary environmental information from the fourth and fifth fields 112, 114.

As above, the host 34 makes a preliminary determination of the environment from databases 38, 40 based upon the geographic source information located in the third field 110 or information received from the cellular system 66. Following a determination of a geographic source and environment of the call, the host 34 for select a public safety entity 12, 22 and compose message 104 to the selected entity 12, 22.

As above, the host 34 may transfer a request to the selected entity 12, 22 for an Internet telephony connection between the PC 44 and assigned agent of the selected entity 12, 22. The request for the voice-over-IP may be contained in the optional field 114 of the message 104. The PSAP agent assigned to the call may gather further information through the voice-over-IP connection and dispatch an appropriate response.

It should be noted, that in some cases, assignment of a PSAP agent to a call may not be necessary. The additional environmental information contained in the fourth and fifth fields may be used to obviate the need for an agent and to further improve system performance. Further, the use of word search routines in the fourth and fifth fields may improve system performance even further.

For example, while the geographic source of a call may set the general parameters of the call, the information in the fourth and fifth fields may allow the host 34 to differentiate between situations with human life is at risk and situations where only property damage is involved. The ability to differentiate between such situations allows the host to precisely frame a response appropriate to the situation.

In the examples offered above, a recognition by the host 34 of the words "fire" and "trapped" may be used as indication of danger to human life. The term "burglar" or "robbery" may also be used.

In framing a response, the host 34 may consider information from its own databases 36, 38, 40 and also databases maintained within the respective agencies 12, 22. For example, where the host 34 receives a packet from the PC 44, the host 34 may first determine a geographic location and environment from databases 36, 38, 40. If the host 34 should determine that the environment is a fire in an office building, then the host 34 may query databases in a selected public safety entity 12, 22 to determine whether the public safety entity is fighting a fire at that geographic location.

If the host 34 determines that the public safety entity 12 is fighting a fire at that geographic location, then the host 34 may send a further query requesting the identity of any fire-rescue units present at that location. If a positive response is received from the entity 12, then the host 34 may compose a message for transmission directly to a display unit 53 (e.g., a display pager type device) carried by fire-rescue units at the scene of the fire. The message may be transmitted through a local transmitter 55 and link 51 to the unit 53. The display pager type device 53 may display the full message including geographic information and environment for the benefit of the fire-rescue unit.

Under another illustrated embodiment of the invention (FIG. 5), the host 34 may automatically reconfigure the structure of public safety entities in response to natural or man-made disasters. For example, if a tornado were to strike a local police station 22 in a first service area 100 (FIG. 5), the lo host 34 may automatically begin routing calls to a second police station 11 in a second service area 102.

In preparation for such a change, the host 34 may send notification to a CPU 56 of the second police station that such a reconfiguration were about to occur and instructions on the type of reconfiguration. In response, the CPU 56 may group its agents accordingly.

For example, a first group of agents 14, 16 may be reserved for calls from the original service area 102 of the entity 11. A second group of agents 18, 20 may be assigned to receive calls from the service area 100 of the disabled entity 22. Communications links may be established between the second group of agents 18, 20 and public safety officers 108, 110.

With a transceiver 104 located in the service area 100 of the disabled first police station 22 and coupled to the second police station 11 through the Internet 52, the reconfiguration of communications links may be accomplished seamlessly, without loss of public safety services in any affected area 100, 102. For example, where the disabled entity 22 goes out of service, calls to police or fire vehicles 108, 110 may be routed through the transceiver 104 from the second police station 11 bi-directionally using voice-over-IP without interruption in communication or coordination of services.

Further, it should be understood, that while it may be desirable, it is not necessary that a public safety entity 12, 22 be proximate or even near a served area. From a practical point of view, the only necessary quality is that its PSAP agents be capable of handling calls from the assigned area.

By routing public safety calls through the host 34, public safety entities and call handling may be reconfigured dynamically. Further, by providing PSAP agents with access to common databases, there is no longer a need for an agent to be proximate or even familiar with a geographic area to effectively serve callers.

A specific embodiment of a method and apparatus for processing public safety calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of processing a public safety call, comprising the steps of:

receiving the public safety call;

determining a geographic source of the public safety call;

determining an environment of the geographic source of the public safety call;

identifying a resource to handle the public safety call based upon the determined source and environment of the call;

selecting a public safety attended position of the identified resource; and forwarding the call to the identified resource.

2. A method of processing a public safety call, comprising the steps of:
  receiving the public safety call;
  determining a geographic source of the public safety call;
  determining an environment of the geographic source of the public safety call;
  correlating the received public safety call with other received public safety calls from the environs of the determined geographic source;
  identifying a resource to handle the public safety call based upon the determined source and environment of the call; and
  forwarding the call to the identified resource.

3. A method of processing a public safety call, comprising the steps of:
  receiving the public safety call as a packet message from an Internet connection;
  detecting and decoding the packet message to determine a geographical source of the public safety call from a data field embedded within the packet;
  determining an environment of the geographic source of the public safety call;
  identifying a resource to handle the public safety call based upon the determined source and environment of the call; and
  forwarding the call to the identified resource.

4. The method of processing public safety calls as in claim 3 wherein the step of receiving the call as a packet message from an Internet connection further comprises receiving a web telephony call.

5. The method of processing public safety calls as in claim 3 wherein the step of receiving the call as a packet message from an Internet connection further comprises receiving an e-mail message.

6. A method of processing a public safety call, comprising the steps of:
  receiving the public safety call;
  determining a geographic source of the public safety call;
  determining an environment of the geographic source of the public safety call;
  identifying a resource to handle the public safety call based upon the determined source and environment of the call; and
  forwarding an Internet address of the caller to the identified resource.

7. The method of processing public safety calls as in claim 6 wherein the step of forwarding an Internet address of the caller to the identified resource further comprises including a request to form an Internet telephony voice connection with the public safety caller.

8. Apparatus for processing a public safety call, comprising:
  means for receiving the public safety call;
  means for determining a geographic source of the public safety call;
  means for determining an environment of the geographic source of the public safety call;
  means for identifying a resource to handle the public safety call based upon the determined source and environment of the call;
  means for selecting a public service attended position of the identified resource; and
  means for forwarding the call to the identified resource.

9. Apparatus for processing a public safety call, comprising:
  means for receiving the public safety call as a packet message from an Internet connection;
  means for detecting and decoding the packet message to determine a geographical source of the packet message from a data field embedded within the packet message;
  means for determining an environment of the geographic source of the public safety call;
  means for identifying a resource to handle the public safety call based upon the determined source and environment of the call; and
  means for forwarding the call to the identified resource.

10. The apparatus for processing public safety calls as in claim 9 wherein the means for receiving the call as a packet message from an Internet connection further comprises means for receiving a web telephony call.

11. The apparatus for processing public safety calls as in claim 9 wherein the means for receiving the call as a packet message from an Internet connection further comprises means for receiving an e-mail message.

12. Apparatus for processing a public safety call, comprising:
  means for receiving the public safety call;
  means for determining a geographic source of the public safety call;
  means for determining an environment of the geographic source of the public safety call;
  means for identifying a resource to handle the public safety call based upon the determined source and environment of the call; and
  means for forwarding an Internet address of the caller to the identified resource.

13. The apparatus for processing public safety calls as in claim 12 wherein the means for forwarding an Internet address of the caller to the identified resource further comprises means for including a request to form an Internet telephony voice connection with the public safety caller.

14. Apparatus for processing a public safety call, comprising:
  a call processor adapted to receive the public safety call;
  a first database adapted to determine a geographic source of the public safety call;
  an environment processor adapted to determine an environment of the geographic source of the public safety call;
  a resource processor adapted to identifying a resource to handle the public safety call based upon the determined source and environment of the call;
  an automatic call distributor adapted to select a public service attended position of a municipality identified by the resource processor; and
  a communication processor adapted to forward the call to the identified resource.

15. Apparatus for processing a public safety call, comprising:
  a call processor adapted to receive the public safety call;
  a first database adapted to determine a geographic source of the public safety call;
  an environment processor adapted to determine an environment of the geographic source of the public safety call;
  a correlation processor adapted to correlate the received public safety call with other received public safety calls from the environs of the determined geographic source;

a resource processor adapted to identifying a resource to handle the public safety call based upon the determined source and environment of the call; and a communication processor adapted to forward the call to the identified resource.

16. The apparatus for processing public safety calls as in claim 15 further comprising an Internet connection adapted to receive the public safety call as a packet message.

17. Apparatus for processing a public safety call, comprising:

a call processor adapted to receive the public safety call as a packet message;

a packet processor adapted to detect and decode a geographical source of the packet message by comparing a data field of the packet with a content of a first database;

an environment processor adapted to determine an environment of the geographic source of the public safety call;

a resource processor adapted to identifying a resource to handle the public safety call based upon the determined source and environment of the call; and a communication processor adapted to forward the call to the identified resource.

18. The apparatus for processing public safety calls as in claim 17 wherein the packet processor further comprises an web telephony processor adapted to receive a web telephony call.

19. The apparatus for processing public safety calls as in claim 17 wherein the packet processor further comprises an e-mail processor adapted to receive an e-mail message.

20. Apparatus for processing a public safety call, comprising:

a call processor adapted to receive the public safety call;

a first database adapted to determine a geographic source of the public safety call;

an environment processor adapted to determine an environment of the geographic source of the public safety call;

a resource processor adapted to identifying a resource to handle the public safety call based upon the determined source and environment of the call; and a communication processor adapted to compose an Internet packet including an Internet address of the caller and to forward the composed packet to the identified resource.

21. The apparatus for processing public safety calls as in claim 20 wherein the Internet packet further comprises a data field adapted to include a request to form an Internet telephony voice connection with the public safety caller.

* * * * *